P. DE PFYFFER.
VEHICLE WHEEL HUB.
APPLICATION FILED JAN. 21, 1915.
1,210,151.
Patented Dec. 26, 1916.
3 SHEETS—SHEET 2.
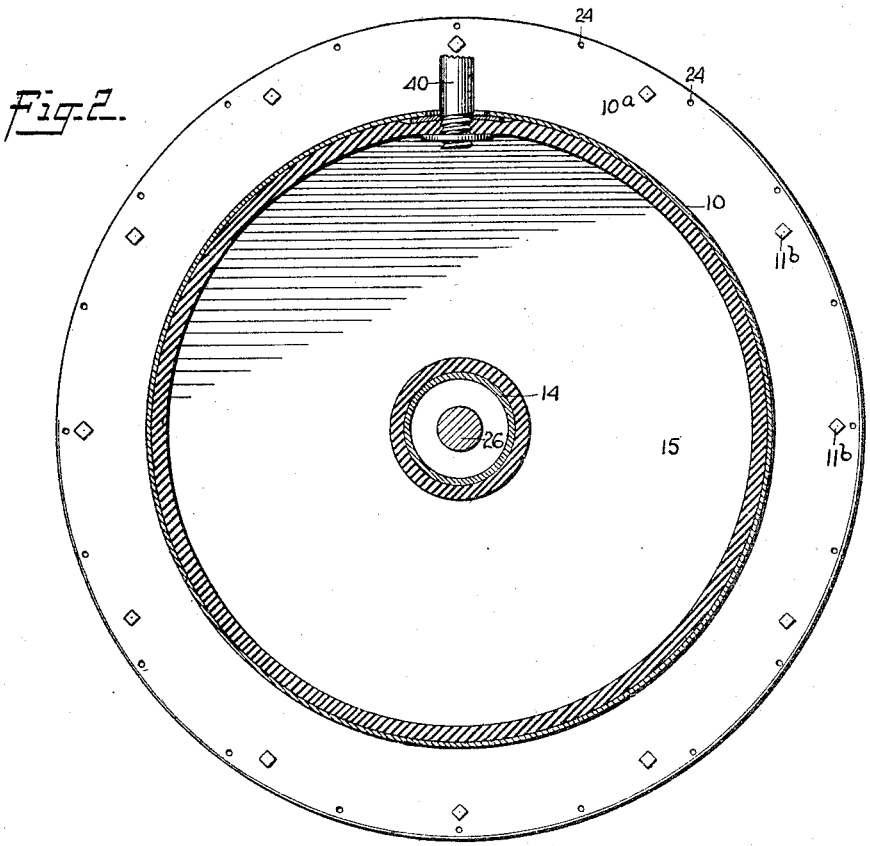
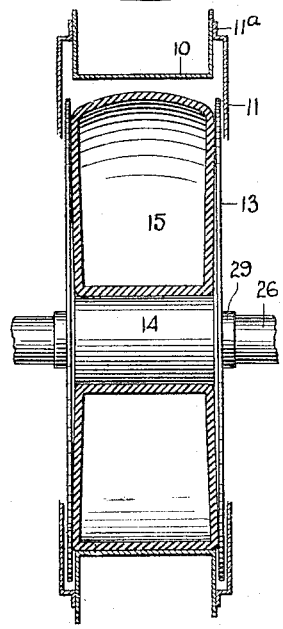
WITNESSES
George L. Blume.
E. B. Marshall
INVENTOR
Paul de Pfyffer
BY Munn & Co
ATTORNEYS P. DE PFYFFER.
VEHICLE WHEEL HUB.
APPLICATION FILED JAN. 21, 1915.
1,210,151.
Patented Dec. 26, 1916.
3 SHEETS—SHEET 3.
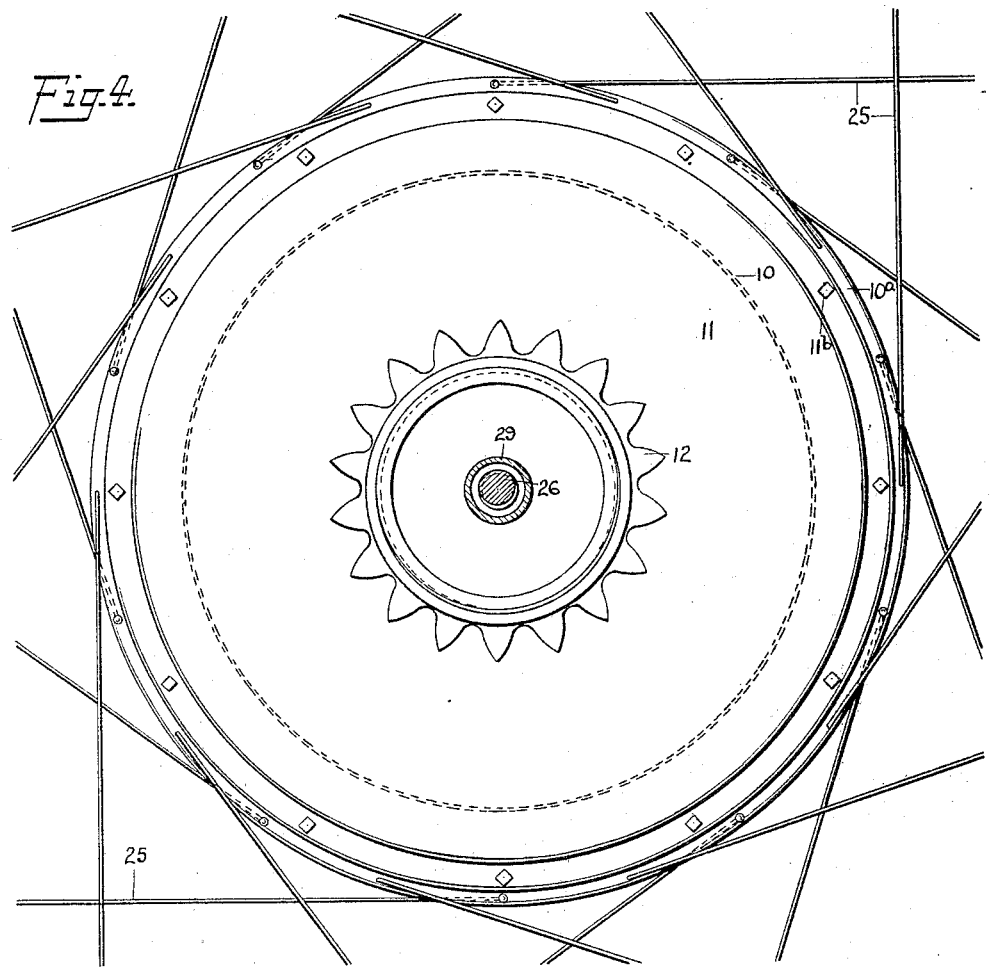
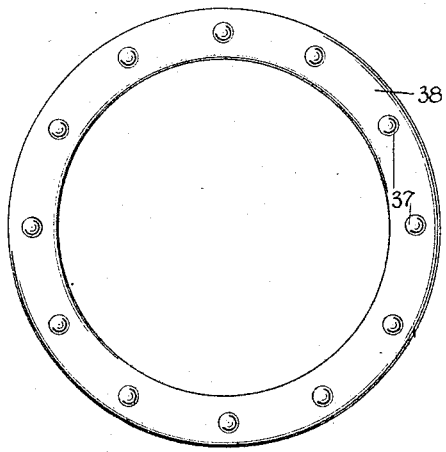
WITNESSES
George L. Blume.
E. B. Marshall
INVENTOR
Paul de Pfyffer
BY Munn & Co
ATTORNEYS

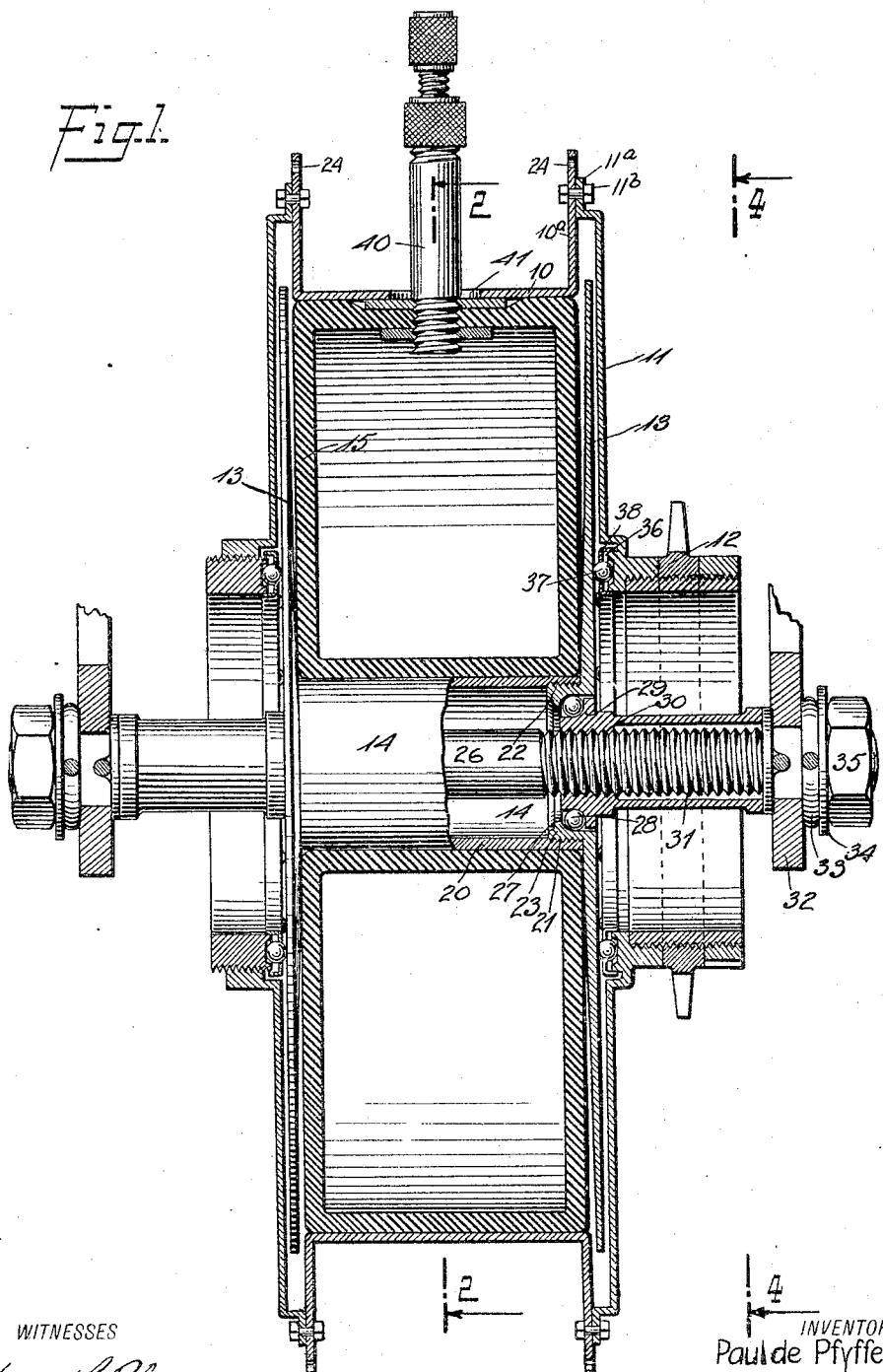

UNITED STATES PATENT OFFICE.

PAUL DE PFYFFER, OF KELOWNA, BRITISH COLUMBIA, CANADA.

VEHICLE-WHEEL HUB.

1,210,151. Specification of Letters Patent. Patented Dec. 26, 1916.

Application filed January 21, 1915. Serial No. 3,651.

*To all whom it may concern:*

Be it known that I, PAUL DE PFYFFER, a citizen of Switzerland, and a resident of Kelowna, in the Province of British Columbia and Dominion of Canada, have invented a new and Improved Vehicle-Wheel Hub, of which the following is a full, clear, and exact description.

My invention has for its object to provide a vehicle wheel hub having a hub section and a spoke section which are held yieldingly apart by cushioning means, the spoke section having radial guides for receiving the peripheries of disks which are secured to the hub section and are disposed at the sides of the cushioning means for supporting the latter.

Additional objects of the invention will appear in the following specification in which the preferred form of my invention is disclosed.

In the drawings similar reference characters refer to similar parts in all the views, in which—

Figure 1 is a sectional view of my invention; Fig. 2 is a sectional view on the line 2—2 of Fig. 1, on a smaller scale; Fig. 3 is a view showing the position of the members when the wheel is in use and the cushioning member is compressed; Fig. 4 is a sectional view on the line 4—4 of Fig. 1; and Fig. 5 is a view showing the roller bearing secured to the outer casing, the bearing balls of which are provided for engaging the disks.

By referring to the drawings it will be seen that an outer casing 10 is provided having radially extending sides 11 to which a sprocket 12 is secured. The casing 10 has outwardly and radially disposed portions 10ᵃ to which the flanges 11ᵃ are secured by bolts 11ᵇ. The portions 10ᵃ of the casing are spaced from the sides 11 to form guides for the peripheries of the disks 13 which are disposed between the sides 11 and the cushioning member 15 for supporting the latter. The cushioning member 15 is preferably of the pneumatic type and as shown in the drawings, I prefer to construct it with its radius of greater extent than the axial length of the cushioning member. The sides of this cushioning member are supported at all times by the disks 13. The cushioning member 15 presses against the cylindrical portion 20 of the hub section, this cylindrical portion 20 having threads 21 with which mesh threads 22 on a bearing portion 23 of the hub section 14 from which the disks 13 extend. It will, therefore, be seen that as the sprocket or driving member 12 is secured to the casing 10 having the openings 24 through which the terminals of the spokes 25 extend, this portion of the hub which carries the rim and the tire, will be directly driven and that the casing 10 will be separated from the hub section 14 by the cushioning or pneumatic member 15. The said hub section 14 is so mounted as to rotate freely with little friction on the spindle 26 so that there is very little friction between the casing 10, the hub section 14 and the pneumatic or cushioning member 15. The spokes 25 are shown in Fig. 4.

The bearing portion 23 of the hub section 14 has grooves 27 in which are disposed the balls 28, these balls also engaging the cones 29 which have threaded openings 30 in which the threads 31, on the spindle 26, mesh. Frame members 32 are mounted on the spindle 26 as well as mud-guard stays 33, the usual washers being shown at 34 which are held in place by the nuts 35.

At the sides 11 of the casing 10 there are circular guideways 36 in which are disposed the bearing balls 37, these bearing balls 37 being held in the guideways 36 by the rings 38 which have openings as shown in Fig. 5 of the drawings, through which the balls 37 extend, these bearing walls 37 pressing against the disks 13 to prevent lateral movement of the casing 10 relatively to the hub section 14 while permitting the free radial movement of the casing 10 relatively to the said hub section.

The pneumatic member 15 is inflated through the valve 40 which extends through the opening 41 in the casing.

Having thus described my invention, I claim as new and desire to secure by Letters Patent:

1. In a vehicle wheel hub, a hub section, a casing disposed around the hub section and spaced therefrom, the casing having sides spaced apart, a cushioning member disposed within the sides and between the hub section and the casing, and disks secured to the hub section disposed at the inner side of the sides of the casing and extending to the outer edge of the cushioning member for engaging the outer sides of the cushioning member to support the latter and for guiding the casing to which the spokes are normally secured.

2. In a vehicle wheel hub, a hub section, a casing disposed around the hub section and spaced therefrom, the casing having sides spaced apart, a cushioning member disposed within the sides and between the hub section and the casing, disks secured to the hub section disposed at the inner side of the sides of the casing and extending to the outer edge of the cushioning member for engaging the outer sides of the cushioning member to support the latter and for guiding the casing to which the spokes are normally secured, and ball bearings disposed between the sides of the casing and the disks.

3. In a vehicle wheel hub, a spindle, a hub section disposed around the spindle and spaced therefrom, the hub section having inner threads adjacent its ends, bearing members disposed within the hub section and having outer threads meshing with the threads on the hub section, cones mounted on the spindle and disposed at the outer sides of the bearing members, a casing disposed around the hub section and having sides, a cushioning member disposed between the sides of the casing to normally engage the hub section and the casing, and radial disks secured to the bearing members and extending substantially to the outer edge of the cushioning member, the disks being disposed within the sides of the casing for supporting the cushioning member and for holding the outer casing in position.

In testimony whereof I have signed my name to this specification in the presence of two subscribing witnesses.

PAUL DE PFYFFER.

Witnesses:
T. H. REES,
K. CONLIN.

Copies of this patent may be obtained for five cents each, by addressing the "Commissioner of Patents, Washington, D. C."